Figure 1:
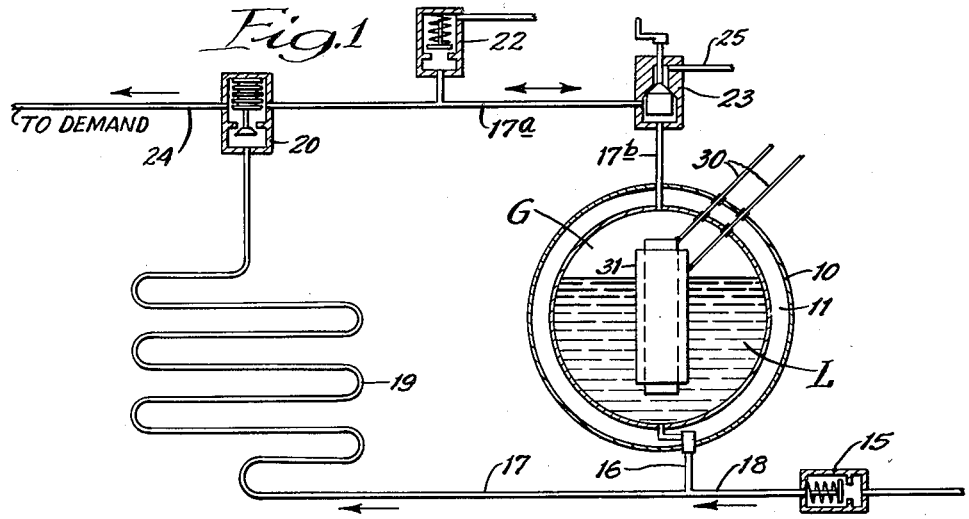

Nov. 1, 1960  R. H. SPAULDING  2,958,204

LIQUID OXYGEN CONVERTER

Filed Aug. 13, 1956

INVENTOR:
Roy H. Spaulding,
BY Bair, Freeman & Molinare
ATTORNEYS.

United States Patent Office 2,958,204
Patented Nov. 1, 1960

2,958,204
LIQUID OXYGEN CONVERTER

Roy H. Spaulding, Bryan, Ohio, assignor to The Aro Equipment Corporation, Bryan, Ohio, a corporation of Ohio Filed Aug. 13, 1956, Ser. No. 603,770

1 Claim. (Cl. 62—51)

This invention relates to liquid oxygen containers which are particularly suited for use in aircraft. Rather than carry heavy pressurized cylinders of oxygen gas, it has been found more advantageous to store the oxygen in liquid form in an insulated container and gasify the oxygen as needed by the occupants of the aircraft. Since one volume of liquid oxygen will expand to approximately 840 volumes of gas, an adequate supply of the liquid can be carried in a relatively small container. It is, of course, essential that each piece of equipment carried by the aircraft be as light in weight as possible. The weight problem has become more acute since the advent of jet aircraft which fly at elevations in excess of 30,000 feet. At these elevations considerably more equipment must be carried for the well being of the occupants. The liquid oxygen system for supplying oxygen for breathing purposes and for pressurizing the cabin or the suit of the pilot in the rarified atmosphere is an absolute necessity.

Every liquid oxygen system consists of several essential elements: (1) a thermally-insulated container, (2) an outlet in the bottom thereof for delivery of the liquid to a heat exchanger wherein the liquid is converted to gas by absorption of heat from the atmosphere, and (3) a pressure build-up circuit which directs the flow of some of the gas to the space in the container above the liquid to cause controlled flow of more liquid into the heat exchanger in response to demand for gaseous oxygen. Many variations of this basic system have been proposed previously, including use of a plurality of coils for heat exchange, an economizing circuit to permit flow of gas in the container to the supply conduit and special valves for providing automatic operation. As far as I am aware, all of these prior art systems have been relatively complicated. They utilize a plurality of conduits containing many valves, each of which provides a hazard to operation since even the best valves are sluggish at temperatures in the range of liquid oxygen (−297° F.). More objectionable, however, the complicated converter constructions are heavy.

It is, therefore, a primary object of this invention to provide a liquid oxygen system of minimum weight, which contains a minimum number of valves and fittings, and which operates automatically in response to demand in a most economical and efficient manner.

In a preferred form of the invention, the converter comprises an insulated container having liquid and gas phases and a combination pressure build-up and economizing circuit consisting of a conduit interconnecting the liquid and gas phases and containing in series a heat exchanger and a pressure closing valve. A supply conduit for providing gaseous oxygen to the personnel of the aircraft constitutes a branch line connecting from the pressure build-up conduit between the pressure closing valve and the gas phase. In a system of this kind the gas being supplied to the demand is taken from the vapor phase of the container before any further quantities of liquid are vaporized, thereby increasing the overall efficiency of the converter and providing for greater duration of supply flows.

Figure 2:
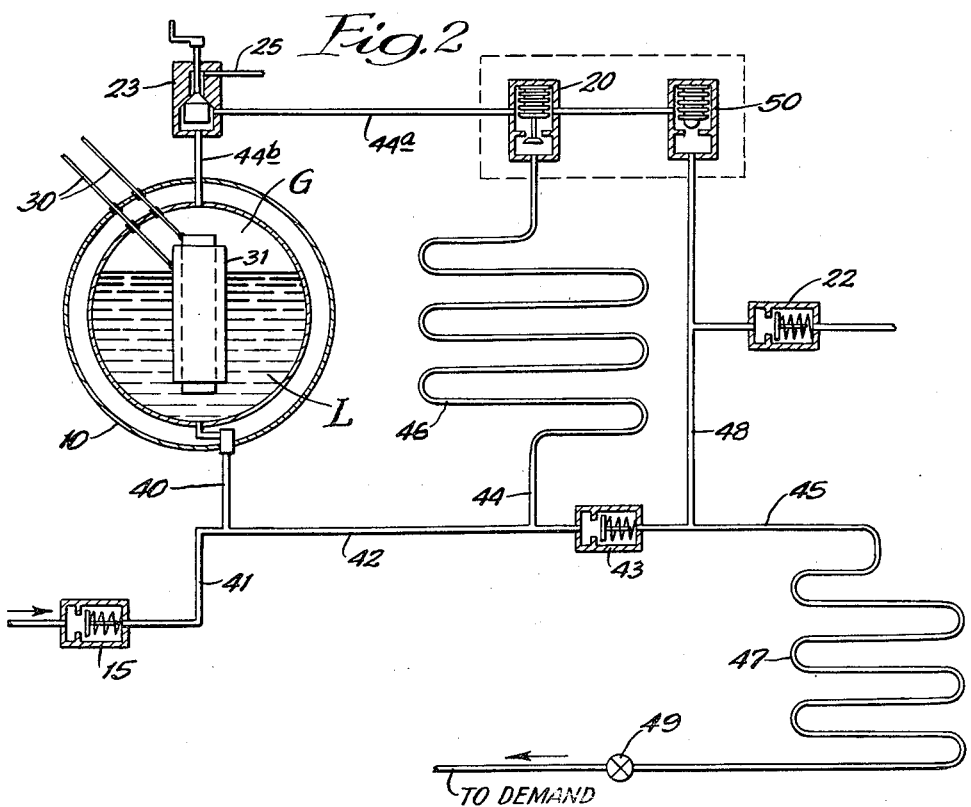

These and other objects of the invention will become apparent from the following description when read in conjunction with the accompanying drawings, wherein:

Figure 1 is a diagrammatic or schematic drawing of a single coil liquid oxygen system suitable for supplying oxygen in relatively small quantities, say, up to 20 liters per minute, and Figure 2 is a similar diagram of a dual coil oxygen converter which is capable of delivering larger quantities of gaseous oxygen than the more simplified form shown in Figure 1.

Reference is made to Figure 1 wherein the container for the liquid oxygen is identified by the numeral 10. Preferably, the container consists of a stainless steel sphere of welded construction enclosed in a similar shell. Only welding provides substantially gas-impermeable joints. The container must be heavy enough to withstand, say, 500 to 1000 pounds per square inch pressure. The space 11 between the spheres is evacuated to provide thermal insulation, thus preventing conduction of heat from the atmosphere to the liquid contents within the inner container. It will be appreciated that liquid oxygen has a temperature of −297° F. Because this temperature is so far below ambient temperature usually prevailing around the container, it is necessary to provide the best possible insulation to insure against premature gasification of the liquid oxygen. The composition of the stainless steel from which the container is made may contain up to .08% carbon, but preferably less than .03% carbon, to prevent carbide precipitation which causes embrittlement at low temperatures.

Preferably, the inner container is suspended within the outer shell in accordance with the invention shown and described in a copending application Serial No. 604,744, now Patent No. 2,924,351, filed of even date herewith. The surfaces surrounding the evacuated space 11 preferably are plated with copper, gold, silver or other suitable metal to further minimize heat losses by reflection. It is also desirable to include a "getter" in the evacuated space 11 to absorb any gaseous molecules that might permeate the outer wall of the container and adversely affect the thermal insulating qualities of the vacuum. Although stainless steel is preferred, the container 10 may be made from other alloys, titanium or other high tensile metals.

The insulated container contains liquid oxygen, or other liquefied gas, identified by the letter L, and a gaseous phase above the level of the liquid, identified by the letter G. An outlet through the bottom of the container connects the liquid phase with a conduit 16, which divides into two branch lines 17 and 18. Branch 18 contains a filler valve 15 for introducing the liquid oxygen into the container. Line 17 with continuations 17a and 17b constitute the pressure build-up circuit and provide communication from the liquid phase to the gas phase. The lines 17 and 17a contain in series a combination warm-up and build-up coil, or heat exchanger 19, an automatic pressure closing valve 20, a relief valve 22 and a combination vent and build-up valve 23. The filler valve 15 in line 18 is of the spring loaded poppet type and is normally closed, but is forced open with the engagement of the ground handling portion of the valve. Valve 15 prevents flow in the reverse direction. The vent and build-up valve 23 shown in the drawing is manually operated, but it may be designed for automatic operation if desired. It is a two-position valve and in one position allows venting of the system to the atmosphere through line 17b during filling or standby and in the other position closes the system to the atmosphere so that gaseous pressure built up in the line 17 will be transmitted to the gas phase within the container 10. The heat exchanger 19 consists of a coil of conductive-metal tubing or any other suitable means for exposing the liquid oxygen to the relatively high atmospheric temperature, thus volatilizing the liquid in the coil to a gas. In this form of the invention the single coil 19 serves both as the pressure producing device for the build-up circuit and as the warming device for the oxygen supplied to the personnel. The gas stream splits downstream of the coil 19 and gas needed to meet demand flows through branch line 24, which connects to the system through the upper chamber of pressure closing valve 20. The pressure closing valve 20 is normally open and closes automatically when the pressure in the line 17 reaches a predetermined maximum. The valve is bellows actuated and spring adjusted so that any desired predetermined pressure may be provided for. Relief valve 22, disposed between valves 20 and 23, is of the standard spring loaded pop type and is set for release of gas at pressures which, if exceeded, might be dangerous. The precise pressure setting is determined by the strength factor of the system and the specified operating pressures. An electric liquid contents gauge in the cockpit may connect to concentric insulated cylindrical probes 31 in the container through lead wires 30. The gauge is designed to indicate the liquid quantity in the container 10 by measurement of the electrical capacitance between the two concentric tubes. The detailed construction of such gauges is well known and forms no part of this invention.

In operating the converter of Figure 1, the container is first filled by setting the vent and build-up valve 23 in "vent" position, which means that the interior of the container is in communication with the atmosphere through the conduit 17b and vent line 25. Liquid oxygen is forced under pressure into the container through the filler valve 15 and line 18. Filling is continued until liquid issues from the valve 23 and the accompanying gauging system indicates that the container is "full." The valve 23 is then moved to "build-up" position so that the conduits 17, 17a and 17b provide through valves 20, 23 and coil 19 an unobstructed passage between the liquid and gas phases of the container. The passage is closed to the atmosphere. Liquid from the container then flows into the line 17 and into the heat exchanger 19 where the liquid absorbs heat and is vaporized into the gaseous state. Evaporation of the liquid in turn causes pressure build up in the line 17, which pressure is imposed on the surface of the liquid in the container. The liquid flows sequentially through line 16, line 17, and into coil 19. The gas produced flows through pressure closing valve 20, the vent and build-up valve 23, and into the gas phase of the container 10, through line 17b. The circulation and pressure build-up continue until the predetermined pressure, at which pressure closing valve 20 has been set, is reached. At this point, the valve 20 closes, stopping further pressure build-up.

Upon attaining operating pressure, the converter is ready to deliver gaseous oxygen required by the air crewmen. The supply to the crewmen is fed through the conduit 24, which connects conveniently to a fitting provided therefor in the top of the pressure closing valve, thus eliminating a separate fitting. The conduit 24 connects downstream of the pressure closing valve itself, and could just as well connect to line 17a at any point between the pressure closing valve and the vent and build-up valve. However, it is not only convenient to provide a suitable connection in the body of the pressure closing valve, but this construction also saves weight by eliminating extra fittings. Upon opening the outlet valve (not shown) in the supply line 24 to meet demand for oxygen, the pressure in that line drops, which in turn causes the pressure closing valve to open, thus initiating the flow of compressed gas from the coil to the supply. At the same time, a portion of the gas flows back into the vapor phase of the container. Thus, circulation in the system is maintained until the demand has been met. When the outlet valve in line 24 is closed, the pressure in line 17 and coil 19 builds up sufficiently to close valve 20.

If liquid in the container is gasified due to heat transfer, the pressure will continue to build up in the portion of the circuit downstream of the valve 20 so long as there is no demand. If it reaches the predetermined danger point, relief valve 22 will open to release any excess pressure. When the supply line is opened in response to demand, the pressurized gas in the gas phase of the container is first utilized to meet that demand before any further liquid is gasified. Thus, the gas flows from the top of the container through line 17b, valve 23, line 17a, valve 20 and into the supply line 24. It will be seen that extension lines 17a and b serve dual functions as an economizing circuit and a portion of the pressure build-up circuit. When the pressure is again reduced below the value for which valve 20 is set, the valve opens and liquid from the container is vaporized to meet the demand.

The system shown is designed, for example, to provide oxygen flow requirements up to 20 liters per minute where the container 10 has a capacity of about 5 liters liquid. Such a system is usually designed to operate at pressures of from 70 to 300 pounds per square inch. It will be understood that by employing longer heat exchange coils of larger diameter, higher requirements could be met.

Referring now to Figure 2, which illustrates a system designed to deliver greater quantities of oxygen at pressures of up to 300–350 pounds per square inch, the container 10 is similar to that shown in Figure 1. It is capable of holding larger quantities of liquid, and is constructed to withstand the higher pressures, but the design is the same.

The container has two leads 30 which connect with concentric cylindrical probes disposed vertically within the container. These leads connect through suitable electrical devices to an oxygen quantity indicator (not shown) in the cockpit of the aircraft to indicate the amount of oxygen in the container. An outlet line 40 connects to the liquid phase in the bottom of the container and branches into two lines 41 and 42 just outside the outer wall of the insulated container 10. Line 41 contains filler valve 15, which is identical to the filler valve shown in Figure 1. Line 42 divides into the two branches 44 and 45. Line 45 contains a spring biased pressure differential or check valve 43 which, when open, permits flow of liquid to a separate warm-up and supply coil 47 which may comprise part of the aircraft or may be integral with the converter. This coil serves to gasify liquid to meet the demand. The pressure build-up conduit 44 connects to the line 42 just upstream of the check valve 43.

The pressure build-up conduit contains in series a build-up coil or heat exchanger 46, a pressure closing valve 20, and a combination vent and build-up valve 23. The line 44a connects valves 20 and 23, while line 44b communicates through an opening in the top of the container with the gaseous phase. An economizing circuit for permitting the flow of gas from the gaseous phase of the container directly to the supply line 45 consists of a conduit 48, which connects to line 44a through the upper chamber of the pressure closing valve 20 and contains a pressure opening valve 50 and a relief valve 22. The valve 50 may be conveniently housed with the valve 20 to facilitate making connections. The downstream end of the conduit 48 connects to the outlet line 45 just downstream of the check valve 43. The pressure opening valve 50 is designed to open at a pressure in excess of that for which the pressure closing valve 20 is set. For example, valve 50 may be set to open at 85 pounds per square inch while valve 20 closes at 70 pounds per square inch. Consequently, gas which builds up in the gaseous phase of the container will flow past the pressure opening valve 20 and into the supply line 45 upon reaching the predetermined pressure of 85 pounds per square inch. Thus, any oxygen which has been converted to gas during periods of no demand will be utilized before additional liquid oxygen is volatilized.

The operation of this apparatus is similar to that of the apparatus shown in Figure 1. The container is filled through the filler valve 15 while the vent and build-up valve 23 is open to the atmosphere, thus permitting gases displaced by liquid entering the container to flow out to the atmosphere. Upon filling, the vent and build-up valve is closed so that communication between the liquid and the gas phase in the container is established through the lines 42 and 44. Liquid is gasified in the coil 46 and the pressure generated is imposed upon the surface of the liquid in the container as the gas expands through the lines 44a and b to the top of the container. The equalization of the pressure which results causes additional liquid to flow by gravity from the insulated container into the coil 46, where it is gasified to further increase the pressure in the build-up conduit. The circulation continues until the pressure closing valve 20 closes. When the valve 49 in the supply line 45 is opened in response to demand, the pressure in the line 48 is reduced as gas is fed therefrom to meet the demand. Check valve 43 serves primarily as a restriction to prevent flow of liquid from the container to the warm-up coil 47 in the supply line until such time as all of the excess gas which is generated above the liquid in the container and which exists in the lines 44a and b and the economizing circuit 48 has been utilized. Valve 50 may be set to remain closed until the pressure exceeds, say, 85 pounds per square inch. Any pressure in excess of 85 pounds per square inch will be relieved through the supply line 45. The relief valve 22 is set at a pressure substantially higher than 85 pounds per square inch, say, 100 pounds per square inch, so that gas in the gas phase will remain confined during periods of no demand until the pressure exceeds 100 pounds per square inch. Excessive pressure build up is experienced particularly during extended periods of cycling flow. The greater heat path causes the liquid within the container to vaporize at a more rapid rate than the demand. By the means described, gas which normally would be wasted by discharge through the relief valve is used to meet demand.

From the foregoing description it will appear that I have provided a very simple system which not only utilizes a minimum number of elements, valves, conduits and the like, but also operates in a very efficient manner to utilize all the gas generated by the system. Various modifications of the invention will occur to those skilled in the art and it is not my intention to limit the invention other than as necessitated by the scope of the appended claim.

What I claim as new and desire to secure by Letters Patent of the United States is:

A liquid oxygen converter comprising an insulated container having liquid and gas phase sections, a pressure build-up circuit consisting of a build-up conduit interconnecting said gas and said liquid phases and containing in series a heat exchanger adjacent the liquid phase, a pressure closing valve having a seat and cooperating closure member, a relief valve and a combination vent and build-up valve, said combination valve having a vent port and a valve element movable to close alternately said vent and said build-up conduit, said pressure closing valve having an upper chamber above the valve seat adapted for free fluid flow therethrough, and a supply conduit connecting to said upper chamber for delivery of oxygen gas.

References Cited in the file of this patent
UNITED STATES PATENTS

| | | |
|---|---|---|
| 2,277,314 | Gallagher | Mar. 24, 1942 |
| 2,434,956 | Prentiss | Jan. 27, 1948 |
| 2,576,984 | Wildhack | Dec. 4, 1951 |
| 2,576,985 | Wildhack | Dec. 4, 1951 |
| 2,657,542 | Wildhack | Nov. 3, 1953 |